United States Patent [19]

Kemeny

[11] Patent Number: 5,599,106
[45] Date of Patent: Feb. 4, 1997

[54] BALL-IN-CONE SEISMIC ISOLATION BEARING

[75] Inventor: Zoltan A. Kemeny, Tempe, Ariz.

[73] Assignee: Tekton, Tempe, Ariz.

[21] Appl. No.: 194,170

[22] Filed: Feb. 9, 1994

[51] Int. Cl.[6] ................................. F16C 29/04
[52] U.S. Cl. ........................................ 384/36
[58] Field of Search ................ 384/36, 610, 49, 384/48; 52/167 RS

[56] References Cited

U.S. PATENT DOCUMENTS

| | | | |
|---|---|---|---|
| 4,644,714 | 2/1987 | Zayas | 52/167 |
| 4,726,161 | 2/1988 | Yaghoubian | 52/167 |
| 5,071,261 | 12/1991 | Stüve | 384/36 |

*Primary Examiner*—Lenard A. Footland
*Attorney, Agent, or Firm*—Snell & Wilmer

[57] ABSTRACT

A seismic isolation bearing for structures consisting a steel ball sandwiched between two horizontal, steel load plates. The load plates have a shallow, concave, conical recess of vertical, collinear axis. The cone axis passes through the ball centerline at rest. The load plates are bolted the structure under and above. Gravity restores the bearing's displacement in the lack of external forces. Lateral bearing forces are independent of displacements.

7 Claims, 3 Drawing Sheets

BALL-IN-CONE SEISMIC ISOLATION BEARING

BACKGROUND OF THE INVENTION

This invention relates to seismic isolation bearings for buildings, bridges and other structures; specifically to ball bearings with nonlinear, gravity recentering capacity.

It is common to mount structures on seismic base isolators for safety and economical reasons.

The most frequently used isolators utilize rubber for motion decoupling and bearing recentering. Bearing recentering is shortly called restoring. Bearing's period, size and bearing capacity is limited by the rubber's buckling and roll over state conditions. Practical rubber bearings have around 2 second period; 50% shear strain; and 1,000 psi (lb/in/in) bearing capacity. (Shear strain is the shear displacement to rubber height ratio.) These parameters are not suitable for near fault located seismic isolators. (Near fault is less than 15 miles close to an active seismic fault. Seismic faults are common earthquake sources. Faults, like rivers, criss-crossing several big cities.) Rubber bearings can easily accommodate the 0.02 radian, usually required bearing rotation. Rubber bearings are made of high damping rubber or supplemented by dampers. That is to reduce bearing displacement.

Friction slider bearings were proposed to expand these limitations to about 4 second period and 3500 psi bearing pressure. That is the capacity of a stainless steel and teflon lined steel plate bearing assembly, called teflon bearing. Shear strain is undefined for friction bearings. Instead, the bearing displacement is considered. Teflon bearings are made to 2 to 6 feet displacement, often required at near fault installations. Unfortunately, teflon bearings need rubber plate bed to accommodate bearing rotation. Worst of all, sliding bearings have no restoring at all, thus tend to displace one way only. Restorer need to be supplemented to reduce bearing displacement. The use of rubber plate drops bearing capacity to 1,000 psi.

A recently proposed friction pendulum bearing further expanded the mentioned limitations, by adding gravity restoring. Its friction surface is polymer-matrix coated, mounted on an articulated slider. That articulation allows for bearing rotation accommodation. Spherical sliding surfaces provide proportional gravity restoring. (Proportional restoring has a rubber bearing too. It means linear bearing force-displacement relationship.) Friction pendulum bearings may have 2 to 4 second period, 2 to 4 feet displacement and 10,000 psi bearing pressure on the polymer. Unfortunately, the average bearing pressure remained even below 1000 psi. The constant period is an other draw back. Seismic isolators preferably need transitive period to avoid resonance. Flat friction sliders has transitive period. Transitivity means displacement dependence.

U.S Pat. No. 4,644,714 describes a friction pendulum bearing. Its mechanism mimics a pendulum having gravity restoring. U.S. Pat. No. 4,726,161 (Feb. 23, 1988) describes a rolling bearing with gravity restoring. This utilizes a spring loaded telescoping mast with a housed, lubricated ball bearing rolling in a spherical dish. Also a structural framing and a stabilizator. Due to its limited size and need for maintenance, its use is limited to museum object isolation.

It appears, progress fulfilled needs, but not yet. Ideally bearings should exclude the possibility of overstrain and overload. That means constant restoring and damping forces. Both to be independent of displacement. Constant (nonlinear) bearing forces means physical limitations. Seismic force on structures should be limited by physical means to a safe level. Elimination of rubber, teflon and polymer would be beneficial. That would alleviate the need for fire and weather protection. Also would enhance bearing longevity, alleviating the need for bearing replacement due to ageing. Added displacement limiting capacity would be a natural safety feature. At last, bearing pressures could be increased up to the steet's yield strength to further enhance economy.

It is therefore the main object of this invention is to provide an isolation bearing with constant restoring and damping forces.

Other objects are to provide a bearing with:

displacement independent (nonlinear) restoring;

possibility of proportional restoring;

steel or metal parts only;

transitive period;

very high contact pressure;

high displacement capacity;

capacity to accommodate high bearing rotation; and displacement limitation capability.

SUMMARY OF THE INVENTION

The invention achieves its objects simply by a steel ball in a steel cone mechanism. For symmetry, stability, strength and better control, the cone is doubled. The two cones are machined recessed in two steel plates, called load plates. The cones are of shallow angle and have collinear vertical axis. The cone axis passes through the ball at rest. The cones are concave, inverted and opposing each other. The ball is sandwiched between the cones.

The ball at limit displacement touches the recess perimeter. At that displacement the top plate has moved with the ball. Thus the ball touches the recess of the top plate too. The ball raised the top plate to higher elevation. Gravity then may restore the displacement in the lack of external forces. Vertical and horizontal bearing loads are transferred through the ball. The horizontal-to-vertical load ratio is constant on a cone surface. That translates to constant restoring law. Spherical "cone" provide linear restoring law. (Elastic bodies, like rubber, have linear restoring.) Other nonlinear restoring law is achieved by combination surfaces. Any rotational surface can be approximated by combining cone, sphere or prismatic segments. (These surfaces are easy to manufacture.)

The top plate is bolted to the structure and the bottom one is to the footing. Rubber foam sealant or accordion rubber gasket may be inserted between the load plates.

BRIEF DESCRIPTION OF THE DRAWINGS

The invention may be better understand considering the following drawings in which.

DETAILED DESCRIPTION OF THE DRAWINGS

Figure 1:
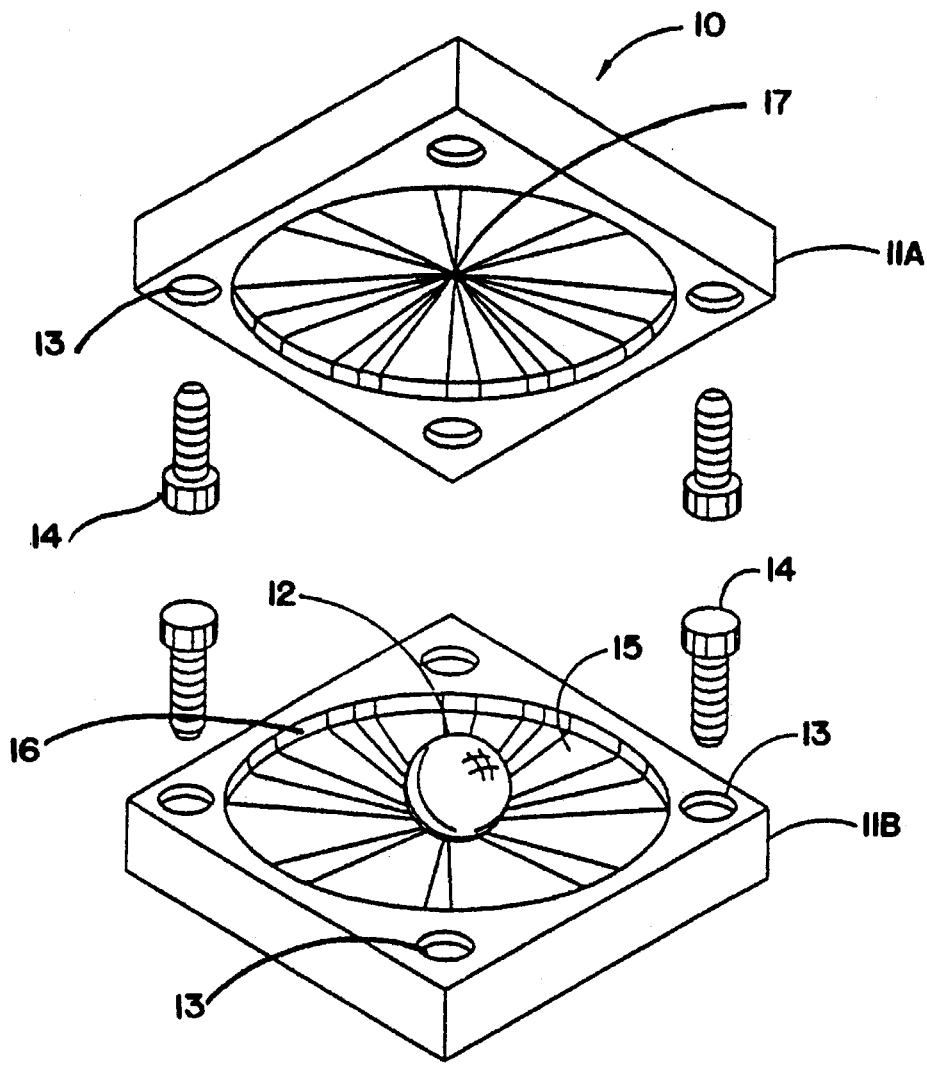
FIG. 1 illustrates a bearing with load plates, anchor bolts and a ball.

FIG. 1 illustrates a ball-in-cone isolation bearing (10). Its main components are: load plates (11); a ball (12); holes for anchor bolting (13); anchor bolts (14); and conical recess (15) in the load plates (11). This represent the simplest bearing configuration, which allows for high, two-way bearing rotations.

Figure 2:
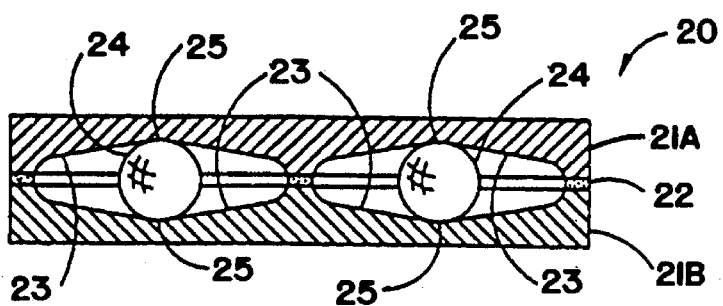
FIG. 2 illustrates a cross section of a bearing of two balls and a foam gasket.

FIG. 2 illustrates a bearing (20) with two balls in cross section. (Or a section of a four-cone bearing.) The bearing has: two load plates (21); a rubber foam gasket (22) glued to one of the two plates; four recess cones (23); and two balls (24) resting between the cone apexes (25). The line connecting the balls centerline is the bearing line. The bearing can accommodate high rotation around the bearing line. Beam ends suffice with one-way rotation. The two-ball bearing is twice as strong as the single-ball bearing. The foam gasket keeps dust away from the cones.

Figure 3:
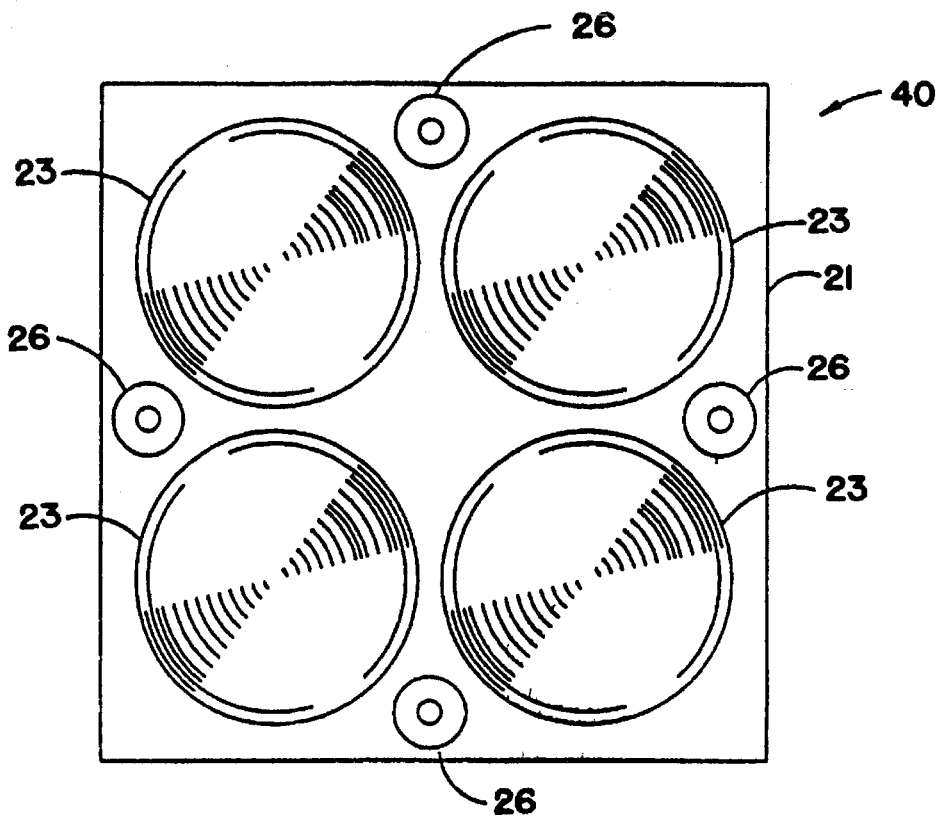
FIG. 3 illustrates a bearing with multiple cone array.

FIG. 3 illustrates a multiple (four) cone bearing (20) in plan. The elements shown here are: load plate (21); cones (23); and counter sink anchor bolt holes (26). (The balls are not shown for clarity.) The centerline of the four cones align to form the bearing plane. Accommodating bearing rotations, two adjacent balls at one side will be overloaded. A four-ball bearing is four times stronger than a single-ball bearing. In most structures multiple ball bearings are applicable. High bearing rotation of multi-ball bearings may be accommodated by bedding plate. That is a supplemental elastic or elastomeric plate placed under the load plate.

Figure 4:
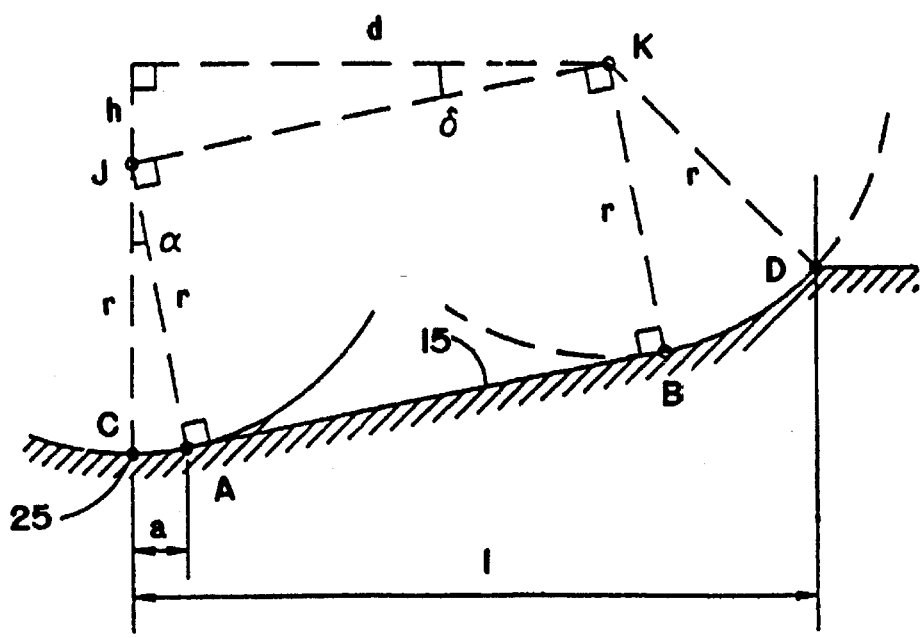
FIG. 4 illustrates a section of a cone of constant restoring.

FIG. 4 illustrates the basic geometry of a half cone (23) in section. The cone apex (25) is the ball's resting point (C). The ball of radius (r) can travel up from contact position (A) to (B). There it will touche the recess point (D) too. During this displacement, the ball center point moves from (J) to (K). Thus, a rise (h) is achieved on a horizontal distance (d). The contact angle at rest is (5) and the rise angle is ($\delta$). Distance (a) is the contact radius at rest. The total horizontal distance (1), corresponding to points (C) and (D) is the cone radius. Also the recess radius. Since line (A) to (B) is linear on slope, the bearing restoring is constant. That is, the first derivative of a slope in respect to its base is constant.

Figure 5:
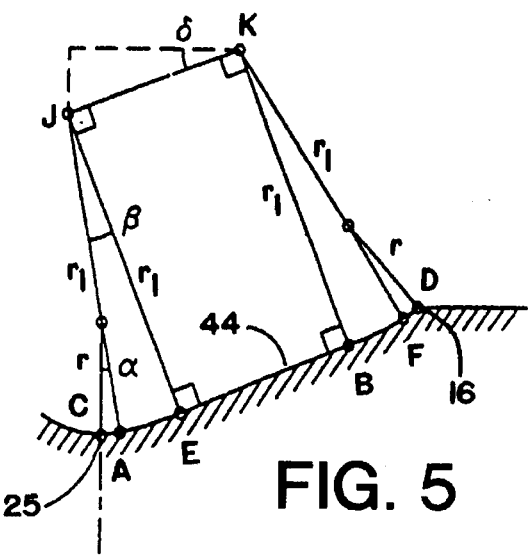
FIG. 5 illustrates a section of a cone of composite, broken linear restoring.

FIG. 5 illustrates a bearing (23) geometry of composite restoring. Particularly of tri-linear, broken linear restoring. The geometry is a slight expansion of the geometry shown on FIG. 4. Thus, labels were retained. However, here a radius of ($r_1$) is added to the beginning and the end of the travel. That provide initial and final proportional restoring. Now, point (F) is the last point on the travel line.

Figure 6:
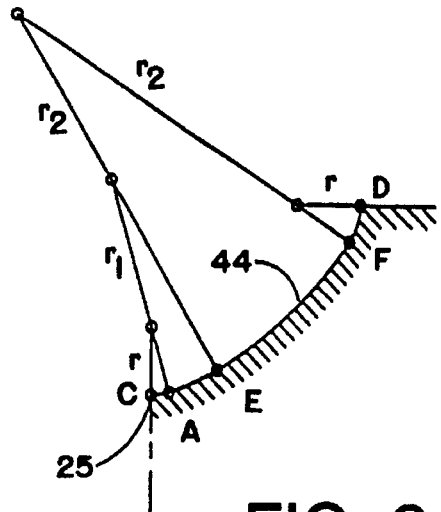
FIG. 6 illustrates a section of a cone of bi-linear, proportional restoring.

FIG. 6 illustrates a bearing (23) geometry of bi-linear composite restoring. Again, labels are retained. Here, the travel is composed by two cosequtive radiuses ($r_1$) and ($r_2$).

Figure 7:
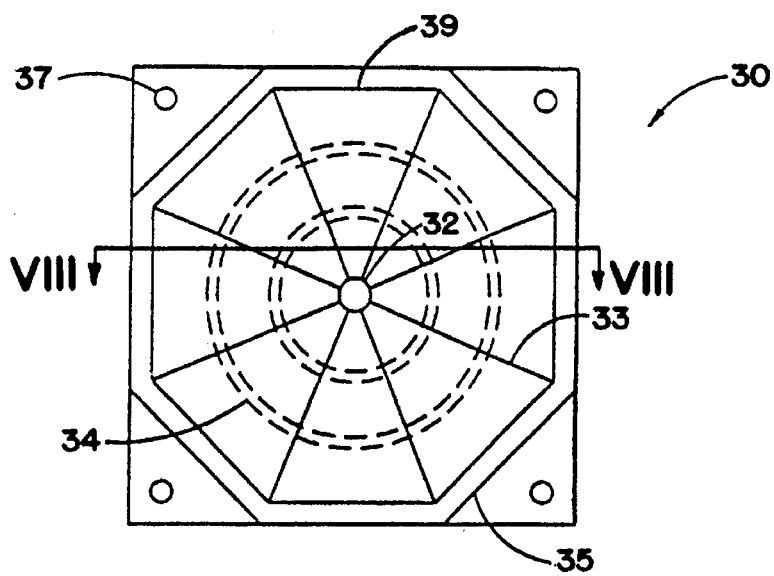
FIG. 7 illustrates a plan view of a built up bearing of prismatic cone.
Figure 8:
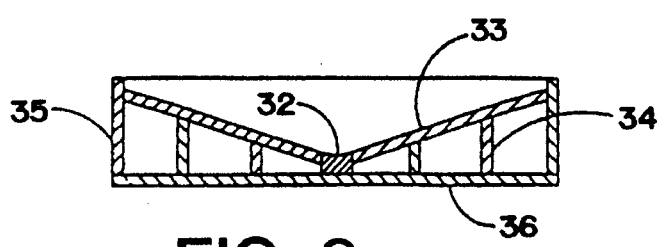
FIG. 8 illustrates a cross section of a built up bearing.

FIG. 7 illustrates a built up, welded assembly bearing (30). Its cross section is illustrated on FIG. 8 next. The elements shown are: base plate (31); central plug (32); weld lines (33); support rings (34); perimeter (or recess) plates (35); and anchor bolt holes (37). For large plan size, the built up bearing construction is more economical. The "cone" surface may be left as shown prismatic without noticeable difference in performance. Optionally may be machined or ground to smoothen response. Cavities over plate (36) may be filled with concrete or other material (not shown).

Figure 9:
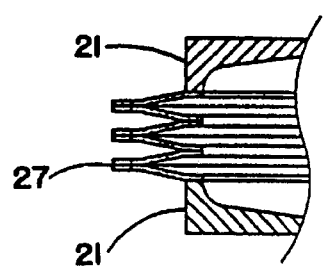
FIG. 9 illustrates an accordion rubber gasket insert.

FIG. 9 illustrates an accordion shape rubber ring (27) which is glued to the load plates (21). That keeps birds nest, water and dust away from the cones. Stainless steel ball and cone may not need such protection.

The ball-in-cone bearing's operation and advantages are as follows:

The top plate is bolted to the structure above, while the bottom plate to the foundation below. Bearing loads are transferred through the ball. The ball is in contact with two opposing conical surfaces recessed in the load plates. An applied, constant horizontal force can keep a ball anywhere on a cone. Upon the removal of that force, gravity forces back the ball to the cone apex, the point of rest. That is the point of the lowest potential. The horizontal force-displacement function (restoring) will be constant. That is the lateral bearing force is independent of the lateral bearing displacement. Restoring forces are conservative. Rolling friction represent a dissipative force, also present in the ball-in-cone bearing. That is a constant function too. Consequently the sum of these two bearing forces are constant too. Thus all bearing forces are constant, as desirable. Such combination can not be achieved with any isolation bearings relying on material properties. I.e., with elasticity and hysteresis or viscosity. Only mechanism and only this mechanism can provide such a unique bearing restoring law. Therefore this is unique. Unique as well because it is capable to provide any nonlinear restoring too. Also, because its transitive period is due to conservative, not to dissipative, forces. Doubling the cones doubles the lateral bearing force and stabilizes the ball at rest. (A bearing with one cone and one flat plate would work too. However, the flat plate has no apex. So it would be sensitive to dislocations.) Rolling friction represent small damping only. Therefore, to reduce bearing displacements the bearing may be supplemented by external dampers.

As usual, sole and masonry planes may be needed to align bearings in sloped, curved and skewed bridges.

Contact pressure (Hertz stress) may reach the hardened steel's yield strength (80,000–12,0000 psi). A stainless steel ball-in-cone bearing assembly need no maintenance, inspection and replacement in service. Applicable materials, however, are not limited to steel. Similarly the bearing function is not limited to seismic isolation.

Finally, experiments demonstrated an other unique bearing property: The ball-in-cone bearing transfer East-West movements to North-South movements. This dynamic orthogonality averages peak directional seismic shocks in our favor. Every automatic averaging process, like this, decreases bearing size and peak response force. In contrast to natural expectation, in an earthquake, the ball seldom, if ever passes the cone apex. Thus the bearing response is smooth.

The simplicity of the bearing is apparent.

I claim:

1. A seismic isolation bearing assembly, comprising:

an upper load plate secured to a structure to be supported, including a first, downward facing rigid surface;

a second load plate secured to the foundation upon which said structure is supported, including a second, upwardly facing rigid bearing surface disposed opposite said surface and defining a bearing cavity therebetween; and a ball sandwiched between said first and second surfaces;

wherein at least one of said surfaces comprises a recessed surface defining a conical cavity within said upper load plate.

2. The assembly of claim 1, wherein said first surface comprises a central apex, a recess perimeter, and a conical region extending therebetween.

3. The assembly of claim 2, wherein said conical surface is characterized by a constant slope.

4. A seismic isolation bearing assembly, comprising:

an upper load plate secured to a structure to be supported, including a first, downward facing rigid surface;

a second load plate secured to the foundation upon which said structure is supported, including a second, upwardly facing rigid bearing surface disposed opposite said surface and defining a bearing cavity therebetween; and a ball sandwiched between said first and second surfaces;

wherein, said first and second load plates and said ball are configured such that the separation between said first and second load plates increases as a linear function of lateral displacement.

5. A seismic isolation bearing assembly, comprising:

an upper load plate secured to a structure to be supported, including a first, downward facing rigid surface;

a second load plate secured to the foundation upon which said structure is supported, including a second, upwardly facing rigid bearing surface disposed opposite said surface and defining a bearing cavity therebetween; and a ball sandwiched between said first and second surfaces;

wherein, said first and second load plates and said ball are configured such that a substantially constant restoring force is exhibited by said structure for at least a portion of the range of lateral displacement of said assembly.

6. A seismic isolation bearing assembly, comprising:

an upper load plate secured to a structure to be supported, including a first, downward facing rigid surface;

a second load plate secured to the foundation upon which said structure is supported; including a second, upwardly facing rigid bearing surface disposed opposite said surface and defining a bearing cavity therebetween; and a ball sandwiched between said first and second surfaces;

wherein, said load plates and said ball are configured such that, in response to lateral displacement of said plates caused by an externally applied lateral force, the gravitational force associated with said structure results in a corresponding restoring force tending to return said assembly to its nominal position.

7. A seismic isolation bearing assembly, comprising:

an upper load plate secured to a structure to be supported, including a first, downward facing rigid surface;

a second load plate secured to the foundation upon which said structure is supported, including a second, upwardly facing rigid bearing surface disposed opposite said surface and defining a bearing cavity therebetween; and a ball sandwiched between said first and second surfaces;

wherein, said first surface and said second surface each comprise a recessed surface defining a conical cavity.

* * * * *